May 28, 1935.  E. ROCKAFELLOW  2,002,870
METER BELLOWS
Filed Dec. 21, 1932
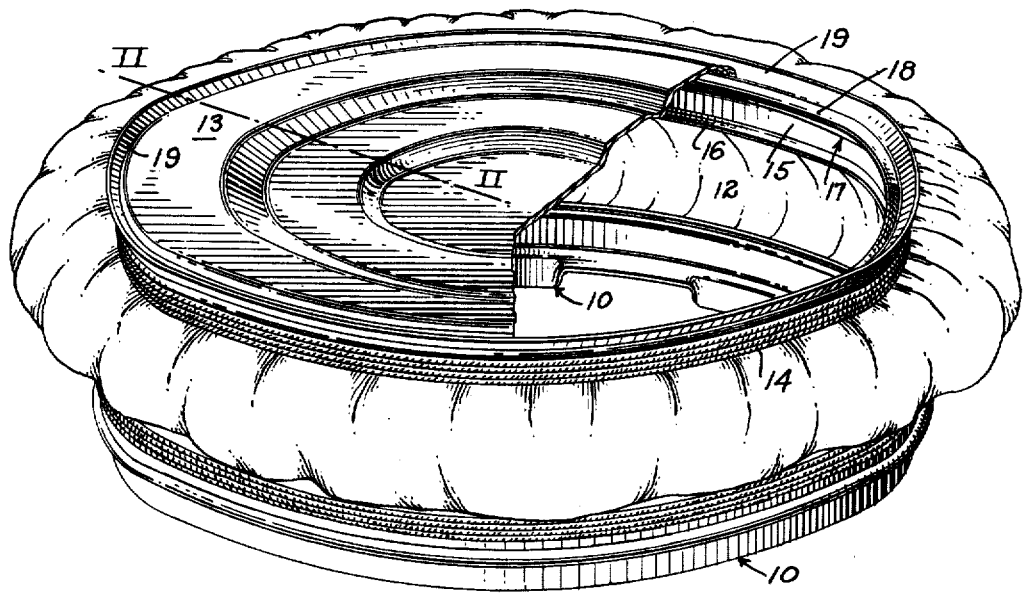
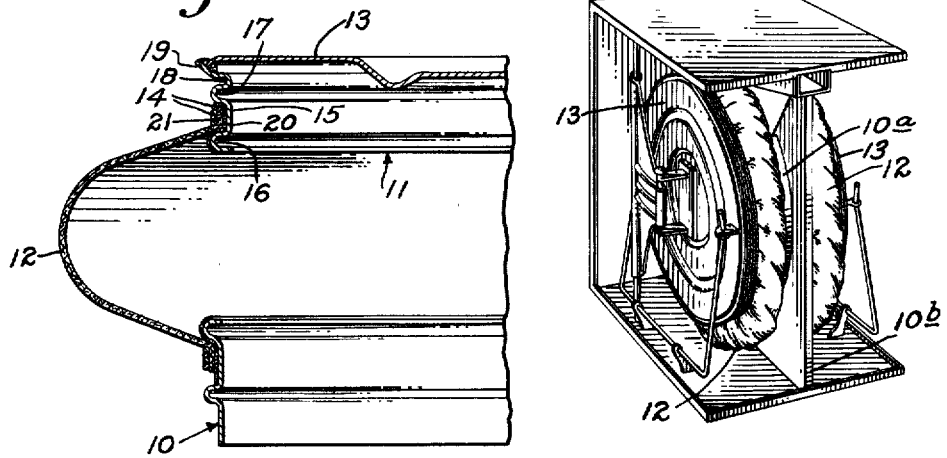
INVENTOR.
Edward Rockafellow.
BY
ATTORNEY.

Patented May 28, 1935

2,002,870

UNITED STATES PATENT OFFICE 2,002,870

METER BELLOWS

Edward Rockafellow, San Francisco, Calif., assignor to American Meter Company, a corporation of Delaware Application December 21, 1932, Serial No. 648,238

1 Claim. (Cl. 73—1)

This invention relates to a meter bellows and more particularly to improved construction in bellows having a disc plate closure at one end.

It is one object of this invention to provide a novel meter bellows of improved construction.

Another object is to provide an improved meter bellows so constructed as to provide a novel seat for the end or disc plate of the bellows.

Another object is to provide in a meter bellows novel heat radiating means whereby the end plate of the bellows may be soldered onto the bellows subsequent to the fixing of the bellows on a meter, which heat radiating means will positively prevent any impairing of the flexible body portion of bellows during the soldering of the end plate on to the bellows.

A further object is to provide a novel meter bellows that shall be simple in structure, durable, readily assembled on a meter and comparatively cheap to manufacture.

The above and other objects will be made apparent throughout the further description of the invention when taken in connection with the accompanying drawing wherein like reference characters refer to like parts. It is to be distinctly understood that the drawing is not a definition of the invention but is merely one form of a device illustrating the invention. The scope of the invention will be defined by the appended claim.

In the accompanying drawing illustrating one form the invention may take,

Fig. 1 is a perspective view of a meter bellows embodying the invention having a portion broken away in order to show the details of construction.

Fig. 2 is a fragmental sectional view taken along line II—II of Fig. 1 and

Fig. 3 is a perspective view of a part of a meter showing the manner in which the present invention is placed on a meter.

The present bellows is particularly but not necessarily adapted for use with meters for gaseous fluids. In the form shown, the present bellows comprises an outer rim represented in its entirety by 11, an intermediate, flexible body portion 12 of suitable material such as leather so as to be collapsible, and an outer end or disc plate 13 connected to outer rim 11, and an inner rim 10 which is connected to the opposite side of the flexible body 12.

Since these bellows are mounted in complementary pairs on respective sides of a supporting plate 10b, as shown in Fig. 3, it is desirable, in order that access may be had through the bellows for first fixing, as by soldering, the inner rim 10 to the meter proper as at 10a, that the end plate 13 be soldered on or fixed to the outer rim 11 subsequent to the mounting of the bellows on to the meter. Considerable difficulty has been experienced in soldering or welding the end plate 13 on the rim 11 due to the heat required for such soldering or welding impairing the co-operating edges of the flexible body portion 12, as well as impairing the means 14 for attaching the flexible body portion 12 to the rim 11. The adjacent or co-operating edges of the flexible body portion 12 are most generally fixed to the co-operating rims by an underlying coating of shellac or similar material to form a gas tight seal, as indicated at 20, and by binding thereover, the adjacent edges of body portion 12 to the respective rims by means of twine and thereafter shellacking the connection for rendering the connection leak proof and rendering the twine impervious to the effects of moisture. As above stated, since it is necessary that access be had through the bellows for fixing the inner rim to the meter proper, the end plate 13 must be fixed on to the bellows subsequent to the fastening of the bellows on to the meter and, as above stated, considerable difficulty has resulted from the heat required to solder the end plate 13 on to the rim 11 due to the heat impairing the co-operating edges of the flexible body portion 12 so that the flexibility thereof is decreased and the material prematurely cracks and produces leaks. The heat also impairs the connection means 14, and also the heat utilized in soldering of the end plate 13 on to the rim 11 causes the shellac used on the connection 14 and on the underlying layer 20, to bubble and often impairs the connection 14 to such an extent that it leaks.

The present invention resides in the novel construction of the rim 11 for providing a radiating surface for dissipating the heat employed for soldering the rim 14 and providing a novel seat 19 on the rim 11 for receiving the end plate 13. The rim 11 consists of an intermediate band portion 15, the band 15 having its edges terminating in radially outwardly extending annular beads 16 and 17 forming a convenient groove between the beads 16 and 17 whereby the co-operating edges of the flexible body 12 may be circumferentially bound as at 21, in leak proof contact with the band portion 15 by the binding means 14. It will be realized that the lateral transverse dimension of the meter is very limited and that the available space for means to dissipate the heat is very limited. The novel heat radiating portion of rim 11 consists in forming the rim 11 to provide for the termination of bead 17 in a secondary annular bead 18, the latter terminating in a radially outwardly flared flange portion 19 angularly disposed to the axis of the rim 11. The outwardly flared portion 19 terminates in a maximum diameter greater than the diameter of plate 13, and preferably greater than any other diameter of rim 11 and forming the novel seat for receiving the co-operating edges of end plate 13, the radially outwardly flared portion 19, inturned bead 18, and external bead 17 serving to dissipate the heat employed for soldering the edge plate 13 on to the seat 19 and thereby preventing the impairing of connection 14 and the co-operating portions of the flexible body 12.

Accordingly I have provided a novel meter bellows having an improved rim adapted for connection to a flexible body portion of a meter and for connection to an end plate, the said rim presenting a novel seat for receiving the end plate and novel radiating means between the seat and the portion to which the flexible body portion is connected. The present device is simple, durable, efficient and comparatively cheap of manufacture.

While I have illustrated and described but one embodiment of the invention it will be apparent to those skilled in the art that certain changes, modifications, substitutions, additions and omissions will be made in the structure herein disclosed without departing from the spirit and scope of the invention as defined by the appended claim.

I claim:

A meter bellows including a rim member, said rim member having a grooved portion adapted to receive a binder edge portion of a flexible body, said rim having a radially outwardly flared portion and a plurality of annular bead portions connecting said grooved portion and said outwardly flared portion, one of said beads being turned radially outwardly and opening inwardly and another of said beads being turned inwardly and opening outwardly, the latter of said beads having its axially outer wall connected to the said outwardly flared portion of the rim member.

EDWARD ROCKAFELLOW.